Sept. 23, 1952 R. E. J. NORDQUIST 2,611,493
DEVICE FOR TRANSFERRING ARTICLES FROM ONE CONVEYER TO ANOTHER
Filed May 26, 1947 5 Sheets-Sheet 5

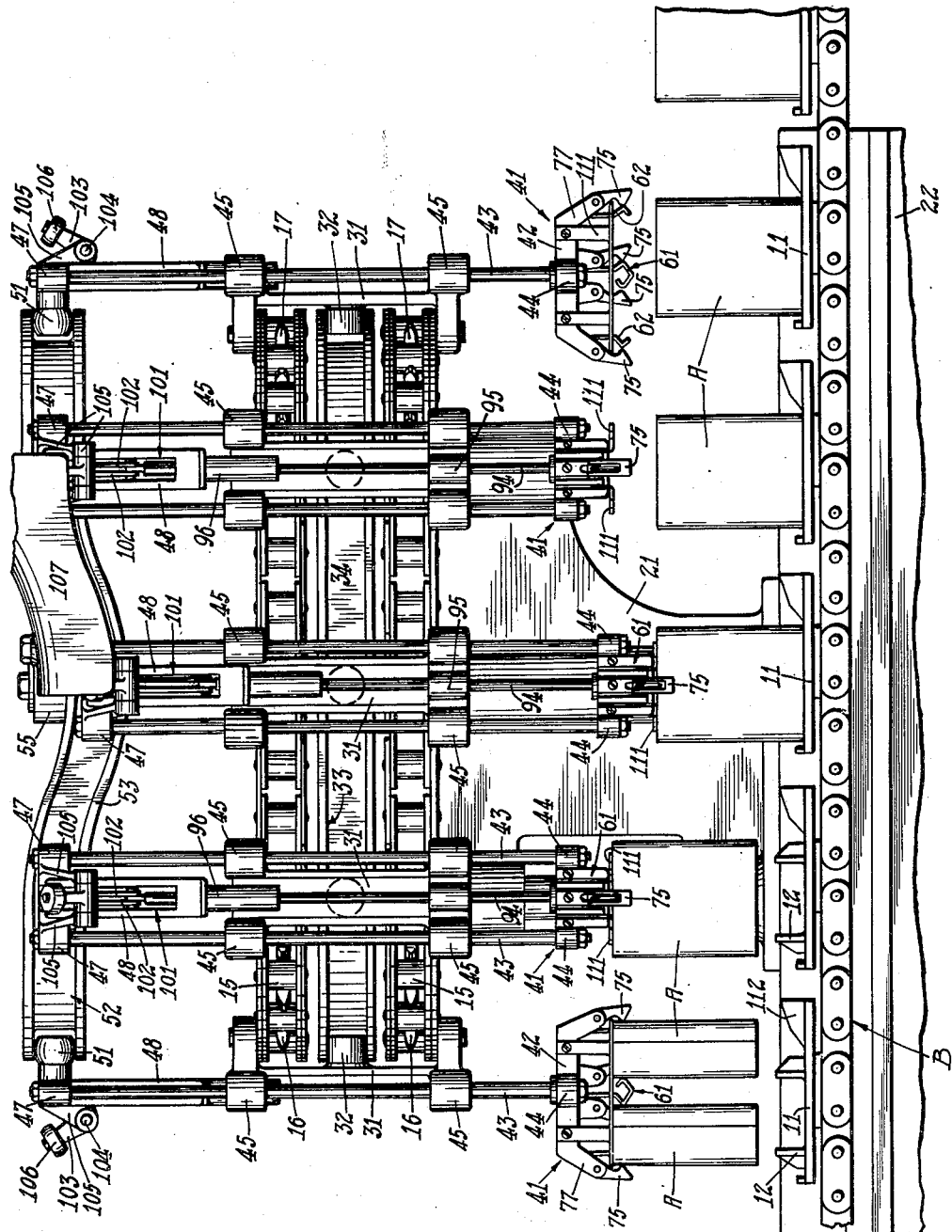

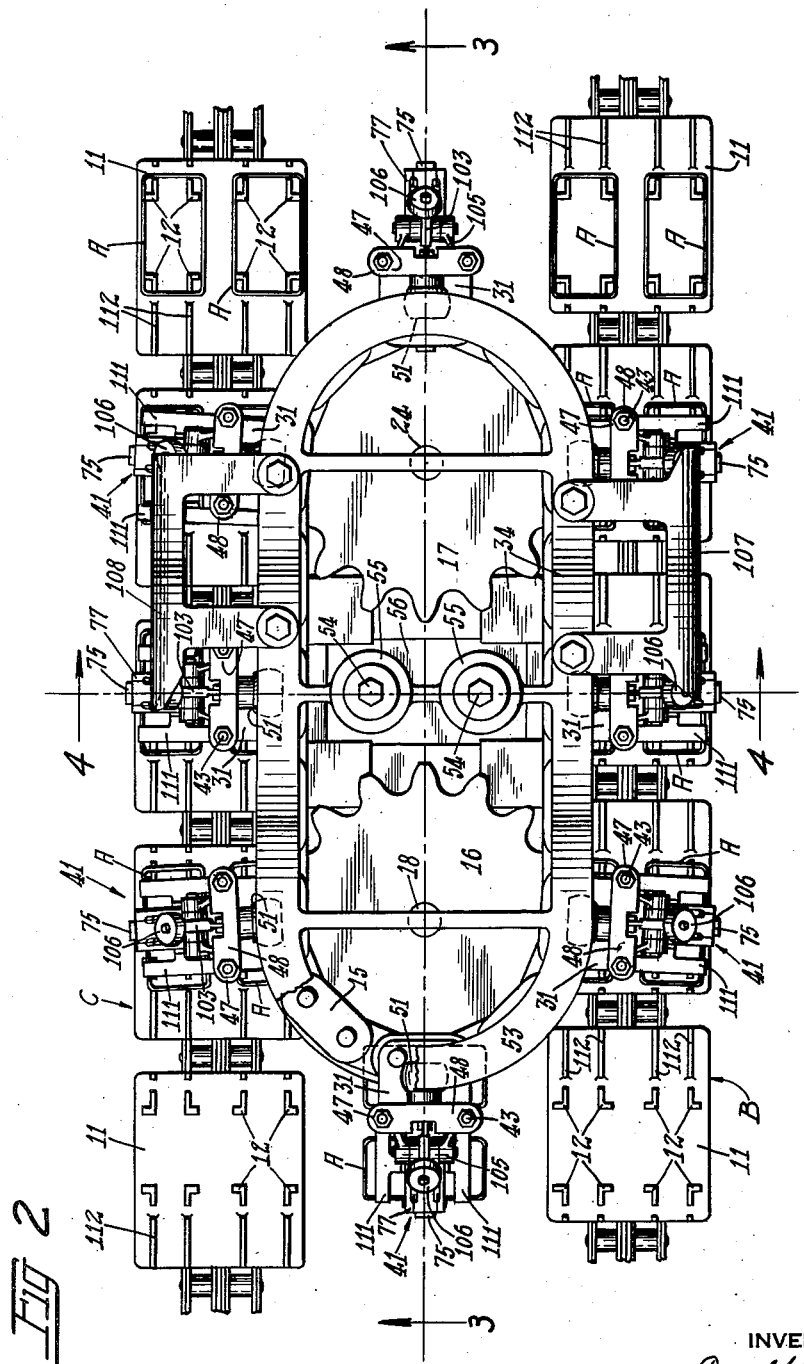

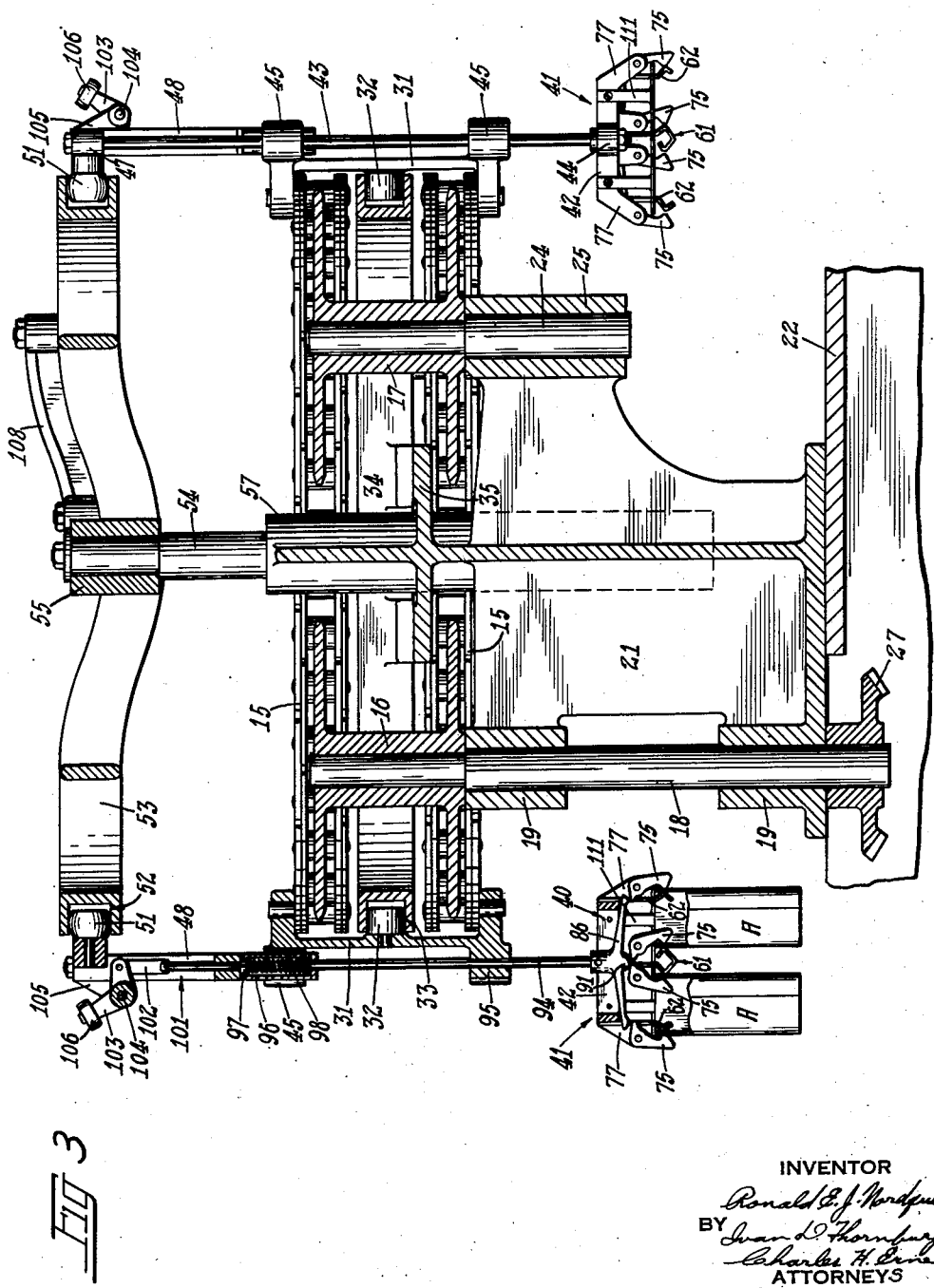

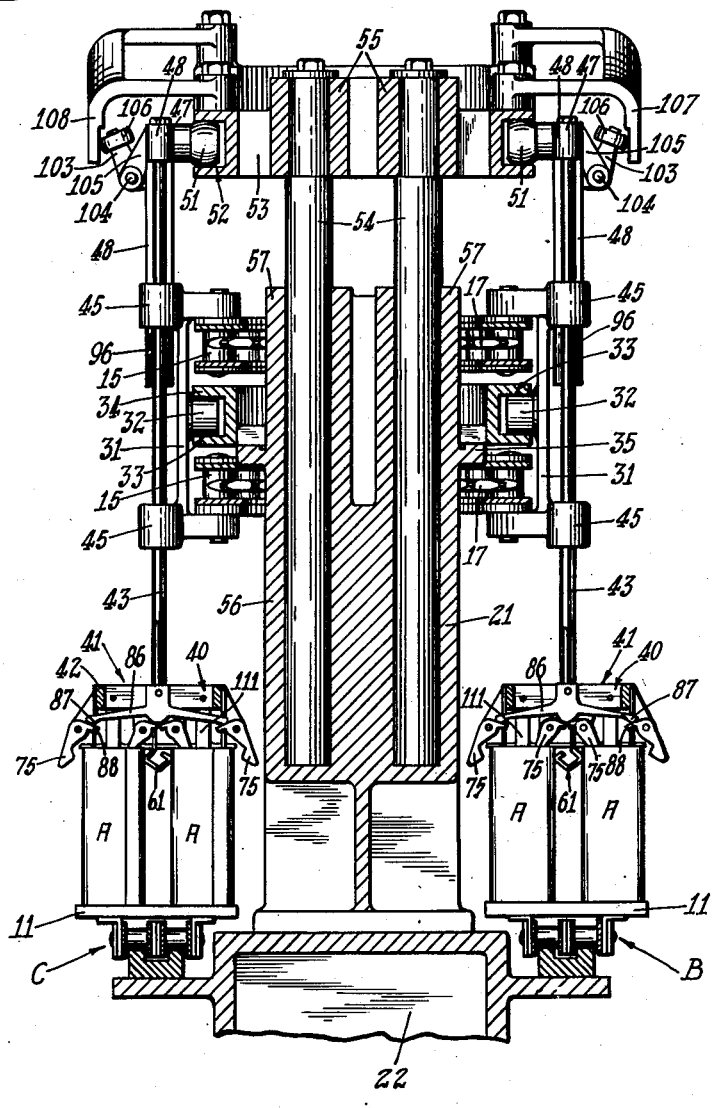

INVENTOR
Ronald E. J. Nordquist
BY Ivan D. Thornburgh
Charles H. Erne
ATTORNEYS

Patented Sept. 23, 1952

2,611,493

UNITED STATES PATENT OFFICE 2,611,493

DEVICE FOR TRANSFERRING ARTICLES FROM ONE CONVEYER TO ANOTHER

Ronald E. J. Nordquist, Maplewood, N. J., assignor to American Can Company, New York, N. Y., a corporation of New Jersey Application May 26, 1947, Serial No. 750,390

7 Claims. (Cl. 214—1)

The present invention relates to a conveyor mechanism for articles such as container or can bodies and has particular reference to transfer devices for transferring bodies from one portion of the conveyor mechanism to another.

An object of the invention is the provision in a conveyor mechanism of transfer devices wherein articles such as container bodies moving in timed and spaced relation in a continuous procession may be bodily transferred from one conveyor to another while maintaining the bodies in their timed and spaced relation and without interrupting the continuity of the procession.

Another object is the provision of such transfer devices wherein transfer of the bodies is effected by a vertical lifting and lowering of the bodies from one conveyor to another so that in conveyors having body holding or locating elements connected therewith, the bodies may be readily freed from the one conveyor and accurately deposited in the proper place on the other conveyor.

Another object is the provision of such transfer devices wherein movement of the bodies from one conveyor to another is effected in a smooth, gentle manner and without in any way nicking, marring, distorting, bending or otherwise damaging the bodies during the transfer.

Another object is the provision of such transfer devices wherein container bodies moving in a plurality of lines or lanes on separate single line conveyors or on a single multiple line conveyor may be transferred simultaneously to other separate single line conveyors or a single multiple line conveyor without in any way disturbing the timing and spacing of the bodies or the continuity of the processions.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a conveyor mechanism embodying the instant invention, with parts broken away;

Fig. 2 is a top plan view of the mechanism shown in Fig. 1.

Fig. 3 is a longitudinal section taken substantially along the line 3—3 in Fig. 2, with parts broken away;

Fig. 4 is a transverse section taken substantially along the line 4—4 in Fig. 2, with parts broken away;

Figure 6:
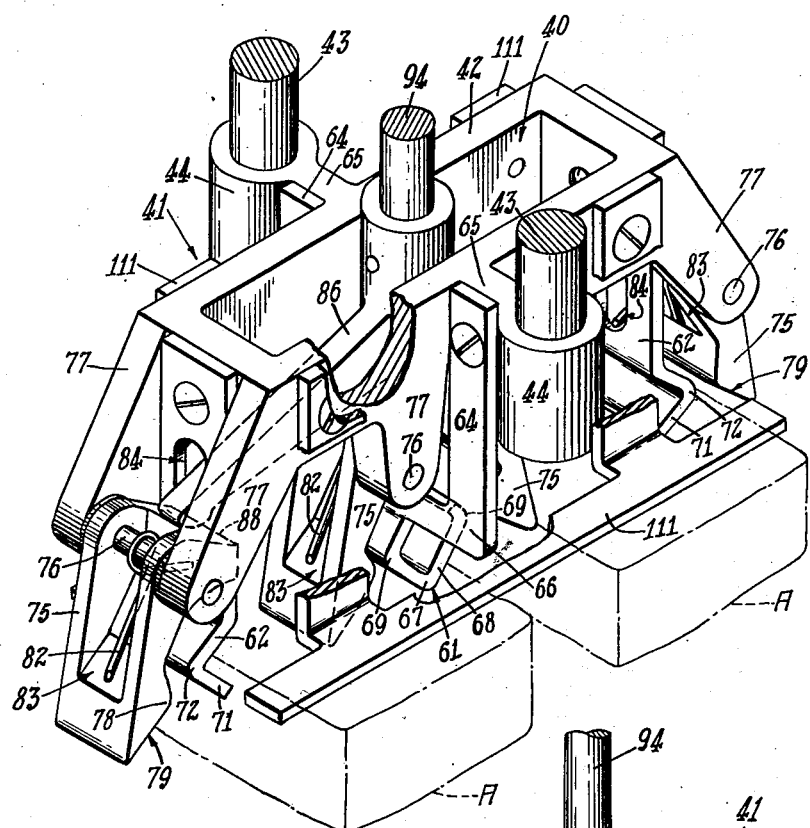
Fig. 6 is an enlarged perspective view of the transfer head shown in Fig. 5, with parts broken away.

As a preferred embodiment of the invention the drawings illustrate a transfer device for transferring, rectangular shaped fibre container bodies A (Figs. 1 and 2) of the type used in containers for frozen foods and other products, from a moving conveyor B to another moving conveyor C (see also Fig. 4) as an incident in the manufacture of the bodies.

By way of example the conveyors B, C are shown in spaced and parallel relation and travel in opposite directions. Each of the conveyors preferably are of the endless chain variety and operate over the usual driving and idler sprockets. These conveyors carry a plurality of body supports or cradles 11 (Fig. 1) secured to the chains at spaced intervals. Each cradle is designed to carry two container bodies A disposed in an upright or on end position and located in a side-by-side relation. A plurality of locating lugs 12 extending up from the cradle locate the bodies accurately on the cradle and hold them against displacement while traveling with the conveyors.

The transfer device is located between the two conveyors B, C and includes a pair of horizontally disposed but vertically spaced and parallel endless transfer chains 15 (Figs. 1 and 3) which operate over a double driving sprocket 16 and a double idler sprocket 17 arranged in spaced relation. The longitudinal runs of these chains are disposed adjacent and above the path of travel of the conveyors B, C and extend parallel therewith.

The transfer chain driving sprockets 16 are mounted on the upper end of a vertical drive shaft 18 which is journaled in a pair of spaced bearings 19 formed in a bracket 21 supported on a frame 22 which may be the main frame of a more elaborate machine which includes the transfer device and spaced horizontally disposed side extensions, best shown in Fig. 3, for the conveyors B, C as parts thereof. The idler sprockets 17 are mounted on the upper end of a short vertical shaft 24 which is journaled in a bearing 25 formed in the bracket 21.

The transfer chains 15 are driven continuously and in time with the conveyors B, C. For this purpose the drive shaft 18 adjacent its lower end carries a bevel gear 27 which may be driven in any suitable manner in time with the conveyors B, C.

The transfer chains 15 carry a plurality of head brackets 31 which bridge the vertical space between the two transfer chains and which are secured to the chains at spaced intervals, the spacing of these head brackets being the same as the spacing of the cradles 11 on the conveyors B, C. These head brackets 31 travel with the transfer chains 15 and thus during a cycle of travel pass around the idler sprockets 17, along and parallel with the feeding conveyor B, thence around the driving sprockets 16, and return along and parallel with the feeding conveyor C.

Each head bracket 31 carries a cam roller 32 disposed adjacent its inner face and located substantially midway between the two transfer chains. The roller operates in a horizontally disposed raceway 33 formed in the outer edge of an oblong shaped member 34 and serves as a track for supporting the head brackets and the chains against sagging between the chain sprockets 16, 17. The member 34 is bolted to a pad 35 formed on the support bracket 21.

Each head bracket 31 carries a transfer head 41 (Figs. 1, 3, 5, and 6) which includes an open rectangular shaped head frame 42. Each head frame is carried on the lower ends of a pair of spaced and parallel vertical support bars or guide rods 43, the rods being secured in a pair of bosses 44 formed on the head frame and located one on each of two opposing sides thereof as best shown in Figs. 1 and 6. The guide rods extend up through two pairs of spaced and vertically aligned slide bearings 45 formed on the outer face of the head bracket 31. The rods thus retain the head frame 42 in a predetermined position relative to the head bracket while permitting vertical movement of the head.

The upper ends of the guide rods 43 extend above the head bracket 31 and are secured in bosses 47 formed on a cam block 48 (Fig. 1) which is disposed between the rods. There is one of these cam blocks for each head 41 and each block adjacent its inner face carries a cam roller 51. These cam rollers operate in a cam groove 52 formed in the outer periphery of an oblong shaped lifting cam 53 (see also Figs. 2 and 4) disposed above the transfer chains 15. This lifting cam is supported in a fixed position on a pair of vertically disposed spaced and parallel posts 54. The upper ends of the posts are secured in a pair of spaced bosses 55 formed on a crossweb 56 of the cam. The major portion of the posts extend down into and are secured in place in a pair of long bosses 57 formed on the support bracket 21.

The cam groove 52 follows along the straight runs of the transfer chains 15 and curves around the chain sprockets 16, 17 for providing a path of travel for the cam rollers 51 similar to the path of travel of the head brackets 31 on the transfer chains. Along the straight portions of the cam, the groove 52 curves downwardly and then upwardly for lowering and raising the heads 41 as will be described more fully hereinafter.

Each of the heads 41 is provided with a centrally located stationary gripper element 61 (Figs. 5 and 6) and two outer stationary gripper elements or shoes 62 disposed one on each side of the centrally located element. The centrally located element is formed as a U-shaped plate having spaced legs 64 which straddle the head frame 42 and which are secured to a web section 65 connecting the bosses 44 to the frame. These legs extend down below the frame and merge into a cross-bar 66 having a depending lug 67 which is bent into a rectangular shaped double gripper shoe 68 providing two oppositely disposed gripper ridges 69.

The outer stationary gripper elements 62 are strap-like members secured at their upper ends to the outer ends of the head frame 42. These elements extend down below the frame and adjacent their lower ends are formed with an outwardly extending V-shaped gripper shoe 71 which provides a gripper ridge 72 disposed in a horizontal plane with the gripper ridges 69 of the double gripper shoe 68.

Figure 5:
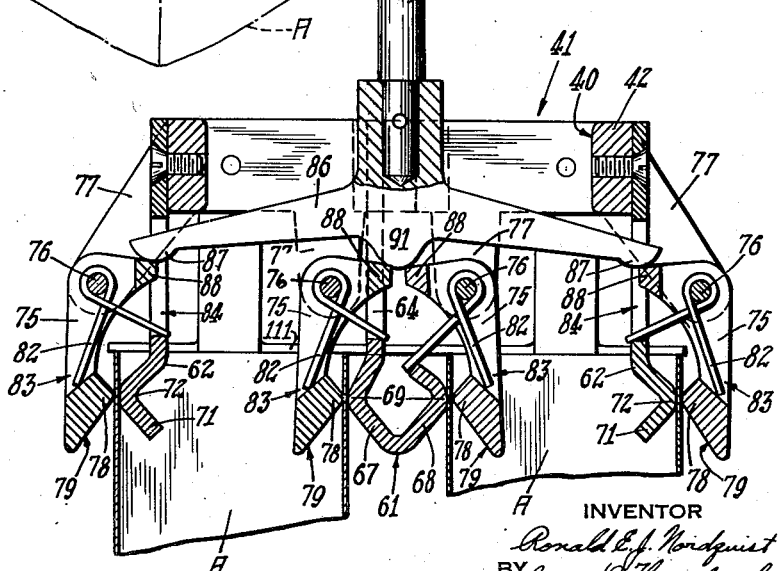
Fig. 5 is an enlarged sectional view of a transfer head used in the mechanism, and showing how containers to be transferred are gripped by the head; parts being broken away.

Adjacent each gripper ridge 69, 72 of the gripper shoes 61, 62, the heads 41 are equipped with spring held movable gripper fingers 75 (Figs. 5 and 6). These gripper fingers at their upper ends are mounted on pivot pins 76 carried in pairs of spaced lugs 77 which depend from the head frame 42. There are four of these gripper fingers 75 for each head 41 and they are located one adjacent each outer end of the head adjacent the two outer stationary gripper elements 62, and two at the middle of the head adjacent and disposed one on each side of the centrally located stationary gripper element 61.

The lower ends of the gripper fingers 75 are formed with gripper ridges 78 which align with and which normally are in contact with the gripper ridges 69, 72 of the stationary gripper shoes 68, 71. These movable gripper ridges 78 are formed as the upper edges of downwardly and outwardly tapered faces 79 of the fingers 75, which faces cooperate with the tapered faces of the gripper shoes in providing a tapered entranceway to the contacting gripper ridges of the stationary and movable gripper elements.

A wire spring 82 (Figs. 5 and 6) disposed in an opening 83 in the gripper fingers 75 and wrapped around the finger pivot pins 76 tend to keep the fingers in contact with the stationary gripper elements. One end of the spring extends through the finger opening and engages against the outer face of the finger. The opposite end of the spring extends through a slot 84 in the stationary gripper elements 62 and engages against the element at the bottom of the slot. At the double gripper element 61, this opposite end of the spring extends into the opening between the legs 64 of the element.

The normally closed gripper fingers 75 are momentarily opened for receiving or picking up the tubular container body A and are again operated for releasing the body as the transfer heads 41 travel with the head brackets 31. This opening of the gripper fingers is effected by an anvil 86 which is disposed within a rectangular slot 40 of the head frame 42. There is one of these anvils for each gripper head. The outer ends of the anvil extends through the slots 84 in the gripper shoes 62 and are formed with rounded buttons 87 (Fig. 5) which engage against short lever arms 88 formed on the two outer gripper fingers 75. Intermediate its ends, the anvil is formed with a centrally located button 91 which engages against short lever arms 88 formed on the two inner gripper fingers 75.

The anvils 86 are movable vertically within the gripper heads 41 and through this movement bear down on the lever arms 88 and thus open the gripper fingers. For this purpose each anvil 86 is secured to a vertical actuating rod 94 (see also Fig. 1) which extends up through a bearing 95 formed on each of the head brackets 31. Above the bearing 95 the rod 94 extends through a spring barrel 96 which is secured to the bottom of the cam blocks 48. Within the spring barrels the rods carry a collar 97 and are surrounded by compression springs 98 which are interposed between the collar and the bottom of the spring barrel as best shown in Fig. 1. These springs normally hold the anvils 86 in a raised position just clear of the lever arms 88 of the fingers 75 so that the finger springs 82 are free to press the gripper ridges 78 of the fingers tightly against the cooperating gripper ridges 69, 72 of the stationary gripper elements 61, 62.

Above the spring barrels 96, the actuating rods 94 extend up through a bearing in the cam blocks 48 and terminate in an opening 101 in the blocks. In this opening the upper ends of the rods are pivotally connected to a pair of parallel links 102. The upper ends of the links are connected to the inner end of a bell crank lever 103. There is one of these levers for each gripper head 41 and they are carried on pivot pins 104 secured in lugs 105 which extend out from the cam blocks 48. The outer end of each lever carries a cam roller 106. These cam rollers, as they travel with the gripper heads along the longitudinal portions of the stationary cam 53, engage against a pair of overhanging stationary face cams 107, 108 (Figs. 1, 2 and 4) secured to the cam 53. These cams are located for actuating the anvils 86 for opening the gripper fingers 75 at the proper time, once for picking a tubular body up from the conveyor B and once for releasing it to the conveyor C.

In operation, a gripper head 41 as it travels around the idler sprockets 17 and starts to move along the straight run of the transfer chains 15, is disposed directly above a pair of container bodies A on a cradle 11 of the conveyor B (Figs. 1 and 2). While in this vertically aligned relation with the bodies, the cam roller 51 on the cam block 48 of the head 41 operating in its groove 52 of the stationary cam 53 approaches the downwardly curved section of the groove on this side of the cam and thereby starts to lower the head 41 toward the container bodies. At this same place, the cam roller 106 on the anvil bell crank lever 103 engages against the inner face of the cam 107 and the roller is lifted. This rocks the inner end of the bell crank lever 103 downwardly against the resistance of the spring 98 and this depresses the anvil 86 against the short lever arms 88 of the gripper fingers 75 and thus opens the fingers to receive the upper portions of opposite container walls. The fingers remain open momentarily while the head 41 continues to move down onto the bodies A.

During this downward movement of the head 41, the open fingers 75 and the stationary gripper elements 61, 62 pass down adjacent the upper marginal edge portions of the side walls of the body, each of two opposing side walls of the two bodies being disposed between one gripper finger and one stationary gripper element as best shown in Figs. 4, 5 and 6.

As soon as the head reaches its lowermost position on the bodies, the anvil actuating cam roller 106 rides off the overhanging stationary cam 107 and this releases the pressure on the spring 98. The spring thereupon raises the anvil 86 and this permits the gripper fingers 75 to close under the action of their wire springs 82. The wire springs press the fingers against the adjacent side walls of the bodies and clamp them tightly against the stationary gripper elements 61, 62. The bodies being held between the gripper ridges 78 of the fingers and the ridges 69, 72 of the stationary gripper elements.

With the bodies thus clamped in the head 41, the lifter cam roller 51 moves through the upwardly curved section of the cam 53 and this gradually lifts the head and the bodies clamped therein away from the cradle 11. Stop members 111 (Fig. 6) secured to the heads 41 overhang the top ends of the bodies and hold them against tilting from their vertical position while held suspended in the heads. Thus while the bodies move forward with the transfer chains 15 they are also lifted vertically clear of their cradle 11 and the retaining lugs 12 formed thereon.

The suspended bodies in the head 41 thus leave the path of travel of the conveyor B and pass around the driving sprockets 16 of the transfer chains 15 and are held in a suspended vertical position over the conveyor C. The timing of this transfer of the bodies is such that as the bodies come into position over the conveyor C they are in vertical alignment with a cradle 11 carried on this conveyor and adapted to receive the bodies.

Hence as the suspended bodies move above the conveyor C, the lifter cam roller 51 of the cam block 48 traverses the downwardly curved section of the cam 53 on this side and thus lowers the head 41 and the bodies A carried or suspended therein toward the conveyor C. The bodies are thus lowered into a predetermined position on the retaining lugs 12 of an aligned cradle 11. The lugs are formed with tapered sides to facilitate proper seating of the bodies. The cradles are further formed with curved cam shaped rear webs 112 which are engaged by the lower edges of the bodies as they move down into the cradles and which ease the bodies into proper place of the retaining lugs 12 without injury to the end edges.

When the transferred bodies are fully seated on their cradle 11 of the conveyor C, they are released from the head 41 by an opening of the fingers 75. This opening of the fingers is effected by the cam roller 106 on the anvil actuating lever 103 coming into engagement with the overhanging face cam 108 (Figs. 2 and 4). Contact of the roll with this cam depresses the anvil 86 and thereby swings the gripper fingers 75 outwardly thereby releasing the side walls of the bodies.

While the fingers are momentarily held in this open position relative to the gripper elements 61, 62, the lifter cam roller 51 rides up along the upwardly curved section of the stationary cam 53 and thus lifts the head 41 to a position above and in spaced relation to the bodies. This action withdraws the gripper fingers 75 and the stationary gripper elements 61, 62 from the bodies and leaves the bodies resting on the cradle of the conveyor C in the proper position and continued timed order of advancement to any suitable place of deposit. As soon as the fingers 75 are clear of the bodies, the actuating cam roller 106 rides off the face cam 108 and this lifts the anvil as before and permits the fingers to close. In this closed position of the fingers and raised position of the head the head approaches the idler sprockets 17 and thus terminates its cycle of operation and immediately proceeds through another cycle as just described.

In this manner the heads 41 on the transfer chains 15 pass in timed relation through their cycle of operation and gently and smoothly transfer the container bodies, two at a time, from the conveyor B to the conveyor C without in any way damaging the bodies and while maintaining them in a predetermined spaced and timed order so that a double line continuous procession of bodies flows uninterruptedly from one conveyor to the other. While the preferred embodiment of the invention herein described, feeds and transfers a double line of container bodies, the invention is of course applicable to a single line or if preferred to a triple or any multiple line of containers, such preferred changes requiring merely a contraction or enlargement of the transfer heads 41, cradles 11 etc.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A transfer device for transferring articles such as container bodies from one conveyor to another, comprising in combination a pair of spaced and parallel conveyors operating in time with each other, a plurality of spaced cradles carried on said conveyors and having lugs for retaining container bodies thereon in an upright position, a transfer device bracket disposed between said conveyors, a pair of horizontally disposed and vertically spaced endless transfer chains supported on said bracket, an endless track located between said transfer chains, a plurality of head brackets connecting said chains at spaced intervals and carrying rollers operating in said track for supporting and maintaining said chains in a horizontal plane, a transfer head carried on each of said head brackets, and gripper means mounted on said heads for picking up a body from a cradle on one of said conveyors and for carrying the gripped body across the space between the conveyors and for depositing the body in a cradle of the other of said conveyors.

2. A transfer device for transferring articles such as container bodies from one conveyor to another, comprising in combination a pair of spaced conveyors, an endless chain movable along the paths of travel of the conveyors and across the space between the conveyors, a head bracket secured to said chain, a pair of vertical support bars slidably mounted in said bracket, a transfer head mounted on the lower ends of said bars, a cam block carrying a cam roller mounted on the upper ends of said bars, a stationary cam disposed adjacent said chain and extending along the path of travel of said conveyors and across the space between the conveyors for moving said transfer head toward and away from said conveyors during its travel around said cam, stationary gripper elements on said head, movable gripper elements on said head adjacent said stationary elements, a vertically movable anvil disposed in said head for engagement with said movable gripper elements, support means extending up through said head bracket and said cam block for said anvil, an actuating lever carried in said cam block and connecting with said support means, and a pair of stationary auxiliary cams carried on said stationary cam at places adjacent said conveyors for actuating said anvil for opening and closing said movable gripper elements in time with the vertical movement of said transfer head for picking up a body from one conveyor and for releasing it onto the other conveyor.

3. A transfer device for transferring articles such as container bodies from one conveyor to another, comprising in combination a pair of spaced conveyors operating in time one with the other, a plurality of cradles carried on said conveyors for retaining container bodies thereon, a transfer device bracket disposed between said conveyors, a transfer chain supported on said transfer bracket and movable over and between said conveyors, an endless track mounted on said transfer bracket adjacent said transfer chain, a plurality of head brackets carried by said transfer chain each head bracket having a cam roller operating in said endless track for supporting and maintaining said head brackets in a fixed path of travel, a transfer head carried by each of said head brackets, and gripper means mounted on each transfer head for picking up a body from a cradle on one of said conveyors and for carrying the gripped body across the space between the conveyors and for depositing the body in a cradle on the other conveyor.

4. A transfer device for transferring articles such as container bodies from one conveyor to another, comprising in combination a pair of spaced horizontal conveyors operating in time one with the other, a plurality of cradles carried on said conveyors for entering into and for retaining open ended container bodies thereon, a transfer device bracket disposed between said conveyors, a horizontal transfer chain supported on said transfer bracket and movable over and between said conveyors, a horizontal endless track mounted on said transfer bracket, a plurality of spaced head brackets carried by said transfer chain each bracket having a cam roller operating in said endless track for supporting and maintaining said chain and said head brackets in horizontal paths of travel, a transfer head carried by each of said head brackets, means for lowering a head bracket as it moves toward a conveyor and for raising it as it leaves a conveyor, and gripper means mounted on each transfer head and operable during a said descent of the head for entering into and for picking up a body from a cradle on one of said conveyors, said gripper means during its succeeding ascent carrying the gripped body across the space between the conveyors and during the following descent depositing the body in a cradle on the other conveyor.

5. A transfer device for transferring articles such as container bodies from one conveyor to another, comprising in combination a pair of spaced conveyors for advancing open top container bodies, a transfer head movable from one conveyor to the other for picking up a pair of bodies from one conveyor and for dropping them on the other conveyor, central and outer stationary gripper elements carried on said head, said central gripper element being positioned between adjacent bodies, spring held movable gripper elements disposed opposite said central and said outer stationary gripper elements and cooperating therewith for engaging inside and outside of the walls of two container bodies disposed adjacent to and spaced from each other on one of said conveyors to grip the bodies for lifting and for transfer, and stationary cam means operable through said head for actuating said movable gripper elements to separate them from the stationary gripper elements to release the bodies when brought onto the other of said conveyors.

6. A transfer device for transferring articles such as container bodies from one conveyor to another, comprising in combination a stationary bracket supported centrally of a frame, said frame having spaced horizontally disposed side extensions, a pair of spaced conveyors having horizontal movement over said side extensions for retaining open top container bodies in upright position, a transfer chain mounted on said stationary bracket and having movement in a horizontal plane, a transfer head carried by said chain and having movement between said conveyors, gripper means on said head for partially entering the open top of and for picking up a body carried on one conveyor, horizontal stop means on said head for engaging the top edge of the body during positioning of the gripper means and for holding the picked up body in a predetermined position therein, means for moving said head vertically to bring said gripper means into gripped position on the body for raising said head and body while said transfer chain is transferring the gripped body from one conveyor to the other, and means for releasing the gripped body from said head for deposit on said other conveyor.

7. A transfer device for transferring articles such as container bodies from one conveyor to another, comprising in combination a pair of spaced conveyors, a transfer head movable from one conveyor to the other and movable toward and away from said conveyors for picking up a body from the first and for depositing it on the second of said conveyors, said transfer head including stationary gripper shoes mounted thereon, said shoes having gripping surfaces facing in one direction whereby they initially engage the inner surface of one and outer surface of the other of diametrically opposite walls of a container body without exerting opposing and distorting pressures when handling bodies of slightly varying size during movement of the shoes toward said first conveyor, said transfer head also including gripper fingers movably mounted thereon and having gripping surfaces facing and cooperating with said first mentioned gripping surfaces to alternately grip and release the walls of a container body, means for biasing said gripper fingers toward said shoes, means for moving said fingers away from said shoes during the movement of said head toward said first conveyor to position said shoes and fingers on opposite sides of said diametrically opposite walls of the body on said conveyor, means for moving said transfer head from said first to said second conveyor, and means for moving said fingers away from said shoes to release said body when it is transferred by said head to the second of said conveyors.

RONALD E. J. NORDQUIST.

REFERENCES CITED

The following references are of record in the file of this patent:

UNITED STATES PATENTS

| Number | Name | Date |
|---|---|---|
| 986,483 | Messlin | Mar. 14, 1911 |
| 1,168,905 | Paridon | Jan. 18, 1916 |
| 1,845,839 | Hoge et al. | Feb. 16, 1932 |
| 1,906,604 | Hutchinson | May 2, 1933 |
| 1,946,438 | Drake et al. | Feb. 6, 1934 |
| 2,096,264 | Schutz | Oct. 19, 1937 |
| 2,198,068 | Wadsworth | Apr. 23, 1940 |
| 2,253,283 | Minaker | Aug. 19, 1941 |
| 2,319,474 | Price | May 18, 1943 |
| 2,359,433 | McNamara | Oct. 3, 1944 |
| 2,413,446 | Glassner | Dec. 31, 1946 |